UNITED STATES PATENT OFFICE.

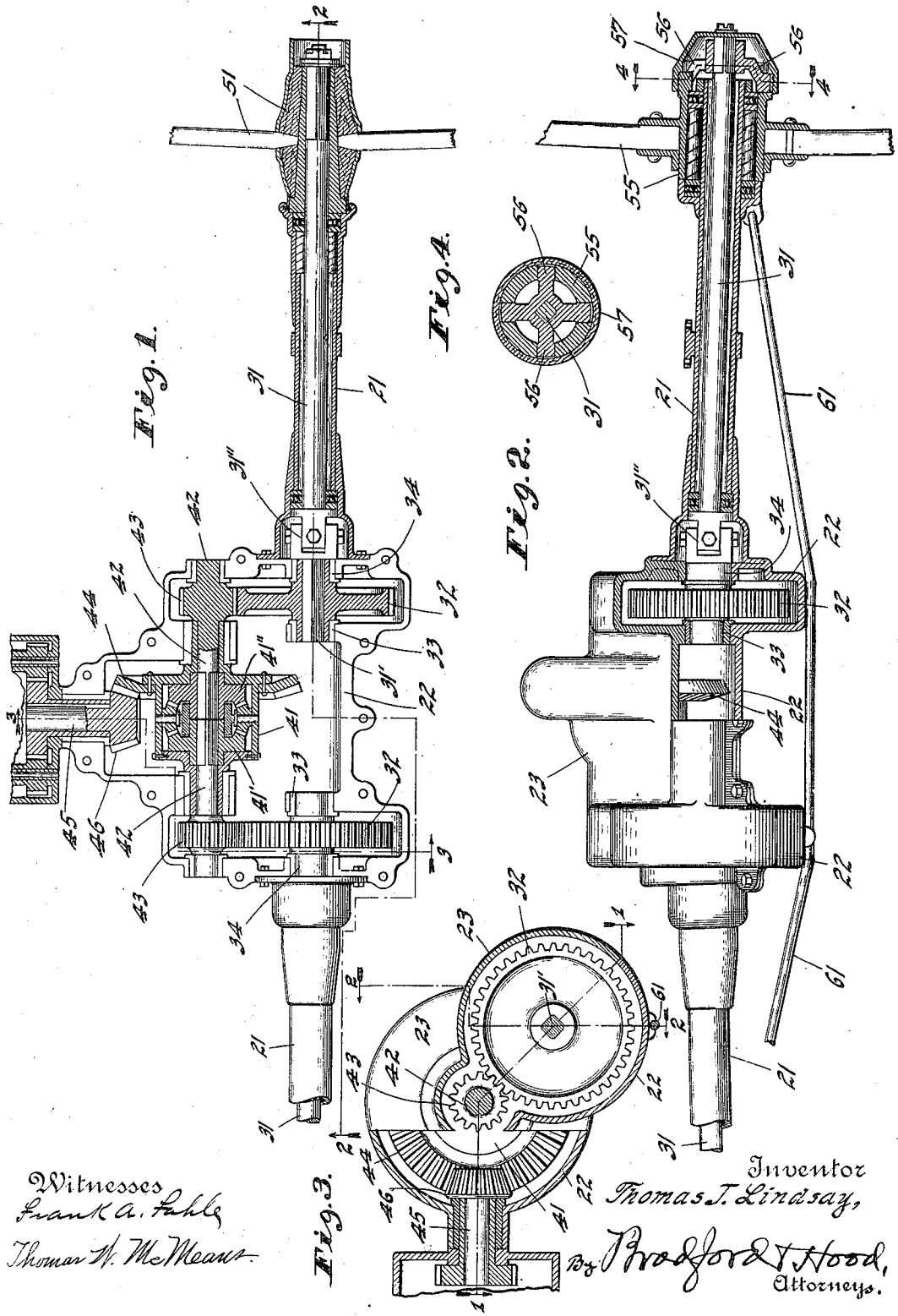

THOMAS J. LINDSAY, OF INDIANAPOLIS, INDIANA.

DRIVING-AXLE FOR MOTOR-VEHICLES.

1,036,659.

Specification of Letters Patent.

Patented Aug. 27, 1912.

Application filed September 21, 1908. Serial No. 453,952.

*To all whom it may concern:*

Be it known that I, THOMAS J. LINDSAY, a citizen of the United States, residing at Indianapolis, in the county of Marion and State of Indiana, have invented certain new and useful Improvements in Driving-Axles for Motor-Vehicles, of which the following is a specification.

In the building of modern motor vehicles it is necessary, in order to produce an acceptable article, that the driving shafts and gearing by means of which the driving wheels are propelled shall be completely incased. It is also necessary that the casing shall be separable at the point where the gearing is located, in order that access may be had to such gearing for purposes of assembling and disassembling the parts, and of providing for their ready and convenient repair and adjustment. As is well known the axle shaft is divided into two parts, and the parts are connected by what is known as a differential or compensating gear, in order that when necessary the two driving wheels may move at different speeds, as in turning corners and the like, without the objectionable "skidding." Heretofore this differential or compensating gear has been secured directly upon the axle shaft sections, so that said shaft sections and the gear had substantially the same axial line. The consequence has been that said shaft sections were necessarily so mounted as to be axially withdrawable to separate the same from the compensating gear when the latter needed to be removed, or an objectionable clutch formation provided between the gear structure and the axle shaft sections. In the class of machines in which the rear axle is propelled by a driving shaft, there is also an objectionable end thrust, due to the necessary sidewise stress exercised by the bevel gears. It is also necessary in such form of construction for the axial lines of the driving shaft and the axle shaft sections to intersect.

In my present invention, I place a differential or compensating gear on a separate shaft, and mount the same parallel with the axle shaft sections, and drive each axle shaft section by means of a spur gear from the appropriate compensating gear shaft section, while the compensating gear is driven from the driving shaft (or other driving means) in any usual or approved manner.

A further feature of my invention consists in making the axle shaft sections in parts, which parts are united by means of universal joints, so that I am thereby enabled to give the tubular axle sections surrounding the axle shaft sections such an inclination as will enable me to use ordinary dished wheels and at the same time have those spokes between the hub and the surface over which the vehicle is passing stand in a substantially vertical position.

Other features of my invention consist in certain details of construction and arrangements of parts, as will hereinafter appear.

Referring to the accompanying drawings, which form a part hereof, and on which similar reference characters indicate similar parts, Figure 1 is a view partially in plan and partially in section as seen when looking downwardly from the dotted line 1 1 in Fig. 3; Fig. 2 is a view partially in elevation and partially in section as seen when looking in the direction indicated by the arrows from the dotted line 2 2 in Figs. 1 and 3; Fig. 3 a transverse vertical sectional view as seen when looking from the dotted line 3 3 in Fig. 1, and Fig. 4 a transverse sectional view at the point indicated by the dotted line 4 4 in Fig. 2.

The stationary or casing portion of this axle structure consists of tubular casings 21 surrounding the axle shaft sections and a central casing, composed of two parts 22 and 23, one part (the part 23, in the construction shown) of which is removable in order to give access to the gearing. Within the tubular axle sections 21 are the axle shaft sections 31 by means of which the driving wheels are propelled. These shaft sections are each divided into two parts, as previously stated, and the short inner parts 31' are connected to the main or outer parts 31 by universal joints 31". Upon the parts 31' are the spur gear wheels 32, and these are appropriately mounted in bearings 33 and 34 in the casing section 22. As will be seen these axle shaft sections and the gears mounted thereon are entirely separate from each other, and from the compensating gear, and may be permanently mounted in their respective bearings, from which they need not be removed for any purpose connected with the differential or compensating gear.

The compensating gear (shown only in Fig. 1) is or may be of any ordinary or desired form, and is usually contained within a casing 41. Its principal gears 41' and 41'' are mounted on short shafts or shaft sections 42, which are mounted between suitable bearings in the casing portions 22 and 23, (as best shown in Fig. 1), and which carry spur pinions 43 which engage with and drive the spur gear wheels 32 on the axle shaft sections. This compensating gear is shown as provided with a bevel gear wheel 44 driven from driving shaft 45 by bevel pinion 46. As will be readily seen the entire compensating gear structure may be removed from its bearings and the surrounding casing without disturbing the axle shaft sections or the gears mounted thereon; while the end thrust caused by the engagement of the bevel pinion 46 and bevel gear wheel 44 is wholly taken up by the bearings carrying the compensating gear, and is not to any extent communicated to the axle shaft sections or their bearings. As is best shown in Fig. 3 this arrangement also enables me to arrange the axle shaft sections and the driving shaft in different horizontal planes. This in some cases enables me to position the driving shaft horizontally on one level, while the axle shaft is at a lower level, which is quite an advantage in some arrangements of driving mechanisms.

In Figs. 1 and 2 I have shown the different varieties of driving wheels and wheel mountings. In Fig. 1 the fragment of wheel 51 shown is of the ordinary wagon or buggy wheel type, such as is appropriate to light vehicles or motor buggies, and is shown as secured rigidly on the end of the axle shaft section, by which it is thus both driven and carried. This is an illustration of the application of my invention to the "fixed-hub" type of axle. In Fig. 2 I have shown a fragment of a wheel 55 of the "artillery" type, commonly used in the heavier classes of motor vehicles, and have shown it mounted on a bearing on the end of the axle casing section 21, and driven from the axle shaft section 31 by means of a clutch or gear engagement, which, in the form shown, (see Fig. 4) is a four-armed clutch member 56, the arms of which engage with corresponding notches in the end of the wheel hub. This is an illustration of the application of my invention to the "floating" type of axle. In this form I prefer to inclose the outer end of shaft section and the wheel hub by means of a cap 57.

It may be noted that the downward inclination of tubular axle structure section 21 enabling the lower spokes of the wheel to stand vertically is illustrated in Fig. 2. It is not shown in Fig. 1, as this view (being from an approximately horizontal plane) would not show it.

In Fig. 2 I have shown the axle structure as supported by a truss 61. This may or may not be used, as desired; and, if used, may be of any desired form or arrangement, acording to design or circumstances.

Having thus fully described my said invention, what I claim as new, and desire to secure by Letters Patent, is:—

1. The combination, in a driving axle for motor vehicles, of an inclosing casing having a removable portion to allow access to the interior of the casing, two separate axle shaft-sections mounted therein, a compensating-gear, two separate compensating-gear shaft-sections also mounted in said casing and carrying the compensating-gear free from the axle shaft-sections, a spur gear on each of said axle shaft-sections and compensating-gear shaft-sections whereby the former are driven from the latter, a bevel gear wheel mounted on the compensating gear structure, a driving shaft, and a pinion on said driving shaft engaging with said bevel gear wheel, said driving shaft-sections and said axle shaft-sections being arranged in different horizontal planes.

2. The combination, in a driving axle for motor vehicles, of an inclosing casing having a removable portion to allow access to the interior of the casing, two separate axle shaft-sections mounted therein, each shaft section being divided into parts connected by universal joints the inner parts being each separately supported in two fixed bearings one on each side of the element carried thereby, suitable gearing also within the casing whereby said axle shaft-sections are driven, and a driving wheel at the outer end of each axle shaft-section, the portions of the inclosing casing within which the axle shaft-sections are mounted being inclined whereby when dished wheels are used the spokes thereof between the hub and the surface over which the vehicle is passing may stand approximately vertical.

3. The combination, in a driving axle for motor vehicles, of the driving axle shaft-sections, spur gears carried by said driving axle shaft-sections whereby they are driven, a differential driving gearing, shafts for the differential driving gearing each having two bearings, a spur pinion on each of said last named shafts between the two bearings thereof, said spur pinions engaging with the spur gears on the driving-axle shaft-sections, and said differential driving gearing being positioned to one side of the axis of the axle, and a supporting structure for the foregoing.

4. The combination, in a driving axle for motor vehicles, of the driving-axle shaft-sections, a supporting structure therefor, said driving-axle shaft-sections being mounted separately and independently from each other, bearings in said supporting structure for said driving-axle shaft-sections, a spur gear wheel on each of said shaft-sections, a differential driving gearing positioned to one side of the shaft line of said axle, two short shafts engaged with members of said differential driving gearing respectively, spur pinions on said short shafts engaging with the spur gear wheels of the driving-axle shaft-sections, and two bearings for each of said shafts, one upon each side of each of said spur pinions.

5. A driving axle structure for motor vehicles comprising an inclosing casing, a pair of axle shaft-sections rotatably mounted therein in opposite ends thereof, a pair of gear wheels journaled within the casing one at the inner end of each of the axle shaft-sections and each provided with a pair of bearings one on each side of the gear wheel, a universal joint between each axle shaft-section and the adjacent gear, a second pair of gears also journaled within the casing and each meshing with one of the first mentioned pair of gears and each supported in a pair of bearings one on each side thereof, and compensating gearing connecting said last mentioned pair of gears.

6. A driving axle structure for motor vehicles comprising an inclosing casing having oppositely extended tubular portions and an intermediate gear housing, a pair of spur gears independently journaled in said casing, each gear having two bearings one upon each side thereof, two shaft sections rotatably mounted within the oppositely extending tubular portions of the casing, a universal joint between the inner end of each of said shaft sections and one of the aforesaid gears, a compensating gearing mounted within the casing, and two spur gears connected with the opposite ends of said compensating gearing and meshing respectively with the first mentioned gears.

7. A driving axle structure for motor vehicles comprising an inclosing casing having oppositely extended tubular portions and an intermediate gear housing, a pair of spur gears independently journaled in said casing, two shaft sections rotatably mounted within the oppositely extending tubular portions of the casing, a universal joint between the inner end of each of said shaft sections and one of the aforesaid gears, a compensating gearing mounted within the casing, and two spur gears connected with the opposite ends of said compensating gearing and meshing respectively with the first mentioned gears.

8. A driving axle structure for motor vehicles comprising an inclosing casing having oppositely extended tubular portions and an intermediate gear housing, a pair of gears independently journaled in said casing, each gear having two bearings one upon each side thereof, two shaft sections rotatably mounted within the oppositely extending tubular portions of the casing, a universal joint between the inner end of each of said shaft sections and one of the aforesaid gears, a compensating gearing mounted within the casing, and two gears connected with the opposite ends of said compensating gearing and connected respectively with the first mentioned gears.

9. A driving axle structure for motor vehicles comprising an inclosing casing having oppositely extended tubular portions and an intermediate gear housing, a pair of gears independently journaled in said casing, two shaft sections rotatably mounted within the oppositely extending tubular portions of the casing, a universal joint between the inner end of each of said shaft sections and one of the aforesaid gears, a compensating gearing mounted within the casing, and two gears connected with the opposite ends of said compensating gearing and connected respectively with the first mentioned gears.

10. In a driving axle structure for motor vehicles, the combination of a casing having an intermediate gear housing and oppositely extending tubular portions, two shaft sections each rotatably mounted in one of the tubular casing portions, two driving gears journaled within the casing and each connected with the inner end of the adjacent shaft section, a differential gearing having its main body journaled in bearings within the casing upon an axis eccentric to the axes of the shaft sections and first mentioned gears, a pair of shafts sleeved axially within the main body of the differential gearing and having a non-rotative outwardly withdrawable connection with a center gear of the differential gearing, a gear carried by each of said shafts and meshing with the adjacent gear connected to a shaft section, and an outboard bearing within the casing for the outer end of each of said last mentioned shafts.

11. In a driving axle structure for motor vehicles, the combination of a casing having an intermediate gear housing and oppositely extending tubular portions, two shaft sections each rotatably mounted in one of the tubular casing portions, two driving gears journaled within the casing and each connected with the inner end of the adjacent shaft section, a differential gearing having its main body journaled in bearings within the casing upon an axis eccentric to the axes of the shaft sections and first mentioned gears, a pair of shafts sleeved axially within the main body of the differential gearing and having a non-rotative outwardly withdrawable connection with a center gear of the differential gearing, and a gear carried by each of said shafts and meshing with the adjacent gear connected to a shaft section.

12. A differential gearing unit comprising a main body provided with a pair of oppositely extending axial bearing sleeves, a pair of axial gears rotatably mounted within said main body, planet gears meshing with and connecting said axial gears, two shafts independently journaled within the oppositely projecting bearing sleeves and having their inner ends non-rotatively in engagement with the axial gears by a connection permitting outward axial withdrawal, and a gear carried by the exposed end of each of said shafts, each of said shafts having an outboard bearing journaled beyond its gear.

13. A differential gearing unit comprising a main body provided with a pair of oppositely extending axial bearing sleeves, a pair of axial gears rotatably mounted within said main body, planet gears meshing with and connecting said axial gears, two shafts independently journaled within the oppositely projecting bearing sleeves and having their inner ends non-rotatively in engagement with the axial gears, and a gear carried by the exposed end of each of said shafts, each of said shafts having an outboard bearing journaled beyond its gear.

In witness whereof, I have hereunto set my hand and seal at Indianapolis, Indiana, this eighteenth day of September, A. D. one thousand nine hundred and eight.

THOMAS J. LINDSAY. [L. S.]

Witnesses:
CHESTER BRADFORD,
THOMAS W. MCMEANS.